United States Patent
Tobias et al.

(10) Patent No.: US 11,593,832 B2
(45) Date of Patent: Feb. 28, 2023

(54) DEAL SCORING SYSTEM AND METHOD

(71) Applicant: GROUPON, INC., Chicago, IL (US)

(72) Inventors: Martin Tobias, Seattle, WA (US); Dane Knecht, Austin, TX (US); Samy Aboel-Nil, Austin, TX (US)

(73) Assignee: GROUPON, INC., Chicago, IL (US)

( * ) Notice: Subject to any disclaimer, the term of this patent is extended or adjusted under 35 U.S.C. 154(b) by 0 days.

(21) Appl. No.: 17/444,794

(22) Filed: Aug. 10, 2021

(65) Prior Publication Data

US 2022/0067776 A1    Mar. 3, 2022

Related U.S. Application Data

(63) Continuation of application No. 15/226,827, filed on Aug. 2, 2016, now Pat. No. 11,120,466, which is a
(Continued)

(51) Int. Cl.
*G06Q 30/02* (2012.01)
*G06Q 50/00* (2012.01)
*G06Q 30/0207* (2023.01)
*G06Q 30/0201* (2023.01)
*G06Q 30/0235* (2023.01)
(Continued)

(52) U.S. Cl.
CPC ..... *G06Q 30/0239* (2013.01); *G06Q 30/0201* (2013.01); *G06Q 30/0235* (2013.01); *G06Q 30/0251* (2013.01); *G06Q 30/0267* (2013.01); *G06Q 30/0277* (2013.01); *G06Q 50/01* (2013.01)

(58) Field of Classification Search
CPC .......... G06Q 30/0239; G06Q 30/0201; G06Q 30/0235; G06Q 30/0251; G06Q 30/0267; G06Q 30/0277; G06Q 50/01
See application file for complete search history.

(56) References Cited

U.S. PATENT DOCUMENTS 6,865,545 B1   3/2005   Epstein et al.
8,583,513 B1   11/2013  Talreja et al.
(Continued)

FOREIGN PATENT DOCUMENTS

WO    WO-2008044227 A2 *  4/2008  ............. G06Q 30/02

OTHER PUBLICATIONS

Li, Local Market Characteristics and Online-to-Offline Commerce An Empirical Analysis of Groupon, Aug. 2016, https://doi.org/10.1287/mnsc.2016.2666, p. 1-42.*
(Continued)

*Primary Examiner* — Jerry O'Connor
*Assistant Examiner* — James Webb
(74) *Attorney, Agent, or Firm* — Alston & Bird LLP

(57) ABSTRACT

Prospective deals for a deal vendor's deal inventory may be scored according to one or more population-specific expected-yield scores, such as expected revenue yield, expected new customers yield, and the like. A prospective deal is categorized and characterized according to a number of yield-related characteristics. Some or all of the prospective deal's characteristics are mapped to yield components derived from completed deals that have been offered to a particular population. An expected-yield score for a prospective deal with regard to that population is obtained by combining the mapped yield components.

20 Claims, 7 Drawing Sheets

Related U.S. Application Data continuation of application No. 13/423,098, filed on Mar. 16, 2012, now abandoned.

(60) Provisional application No. 61/453,855, filed on Mar. 17, 2011.

(51) Int. Cl.
  *G06Q 30/0251* (2023.01)
  *G06Q 30/0241* (2023.01)

(56) References Cited

U.S. PATENT DOCUMENTS

| | | | |
|---|---|---|---|
| 8,799,148 | B2 | 8/2014 | Chandran |
| 2004/0039679 | A1 | 2/2004 | Norton et al. |
| 2004/0128193 | A1 | 7/2004 | Brice et al. |
| 2004/0158536 | A1 | 8/2004 | Kowal et al. |
| 2004/0249711 | A1 | 12/2004 | Walker et al. |
| 2006/0122881 | A1 | 6/2006 | Walker et al. |
| 2006/0143075 | A1 | 6/2006 | Carr et al. |
| 2007/0027751 | A1* | 2/2007 | Carson ............... G06Q 30/0273 705/14.46 |
| 2007/0078869 | A1 | 4/2007 | Carr et al. |
| 2007/0162337 | A1 | 7/2007 | Hawkins et al. |
| 2008/0059352 | A1 | 3/2008 | Chandran |
| 2008/0221975 | A1 | 9/2008 | Steul |
| 2008/0247534 | A1 | 10/2008 | Steul |
| 2009/0234710 | A1* | 9/2009 | Belgaied Hassine ........................ G06Q 30/0201 705/7.29 |
| 2011/0099045 | A1 | 4/2011 | Carr et al. |
| 2011/0161149 | A1* | 6/2011 | Kaplan ................. G06Q 30/02 709/204 |
| 2011/0184801 | A1 | 7/2011 | Zucker et al. |
| 2011/0231233 | A1 | 9/2011 | Iannace et al. |
| 2011/0288917 | A1* | 11/2011 | Wanek ................... H04W 4/21 705/14.5 |
| 2012/0116870 | A1 | 5/2012 | Zucker et al. |
| 2012/0116894 | A1 | 5/2012 | Zucker et al. |
| 2012/0130784 | A1 | 5/2012 | Neuhauser et al. |
| 2012/0239484 | A1 | 9/2012 | Tobias et al. |

OTHER PUBLICATIONS

U.S. Appl. No. 15/226,827, filed Aug. 2, 2016, now U.S. Pat. No. 11,120,466, Issued.

U.S. Appl. No. 13/423,098, filed Mar. 16, 2012, 2012/0239484, Abandoned.

* cited by examiner

DEAL SCORING SYSTEM AND METHOD

CROSS-REFERENCE TO RELATED APPLICATION

This application is a continuation of U.S. patent application Ser. No. 15/226,827, filed Aug. 2, 2016, titled "DEAL SCORING SYSTEM AND METHOD," which is a continuation of U.S. patent application Ser. No. 13/423,098, filed Mar. 16, 2012, titled "DEAL SCORING SYSTEM AND METHOD," which claims the benefit of priority to U.S. Provisional Application No. 61/453,855, filed Mar. 17, 2011, titled "DEAL SCORING SYSTEM AND METHOD," each incorporated by reference herein in its entirety.

FIELD

The present disclosure relates to e-commerce, and more particularly to automatically scoring "deals," such as for "deal-of-the-day" websites.

BACKGROUND

Many web sites offer some sort of periodic (e.g., daily) deal. Some retailers, such as Amazon.com and Buy.com, feature a "deal of the day" item in addition to using conventional sales methods. Other web sites operated by deal vendors, such as Tippr.com, Groupon.com, and the like, partially or exclusively sell "deal" vouchers that are good for discounts on specified goods offered by other retailers or merchants. For example, a deal vendor might offer a "deal" voucher that can be purchased for one price (e.g. $25) and that can be redeemed at a particular merchant for goods and/or services having a higher value (e.g. $50) than the purchase price of the deal voucher. Such deal vendors typically earn revenue by retaining a portion of the purchase price of the deal voucher (e.g., when a consumer purchases a $25 deal voucher, the deal vendor may keep $12.50 and pay $12.50 to the merchant at which the voucher can be redeemed). Many such deals are offered only for a limited period of time and/or only in limited quantity.

Some deal-offering services (e.g., Google Offers, provided by Google Inc. of Mountain View, Calif.) may refer to such "deals" as "offers," "special offers," or the like. The term "deal" is used herein to refer to any such deal, discount offer, discount voucher, limited-time offer, limited-quantity offer, or the like.

Consumers often sign up for a deal vendor's mailing list to receive periodic deal offers from a deal vendor, e.g. via a daily email or other communication medium. Although a given deal vendor's mailing list may include consumers from many cities, states, and/or countries, many deal vendors segment their consumer lists into regional populations. For example, many deal vendors segment their consumer lists into populations segregated by city, zip code, or even neighborhood. Some or all of these populations may be offered deals targeted to the population's particular locale (e.g. deals that can be redeemed at a local and/or nearby merchant).

Such periodic deal services (e.g., deal-of-the-day services) have been popular with many merchants. Consequently, many deal vendors may have an inventory of multiple potential deals that the vendor could select for targeting to a given population for a given offer period. A good-performing deal may generate many times more revenue than a bad-performing deal, so many deal vendors may desire to select good-performing deals to offer. However, at the present time, deal vendors typically lack tools (automated or otherwise) for selecting which of a given set of potential deals will maximize revenue (or some other yield metric) for a given population for a given offer period. Rather, many deal vendors rely on human editorial staff to select deals for various populations for a given offer period.

DESCRIPTION

Figure 1:
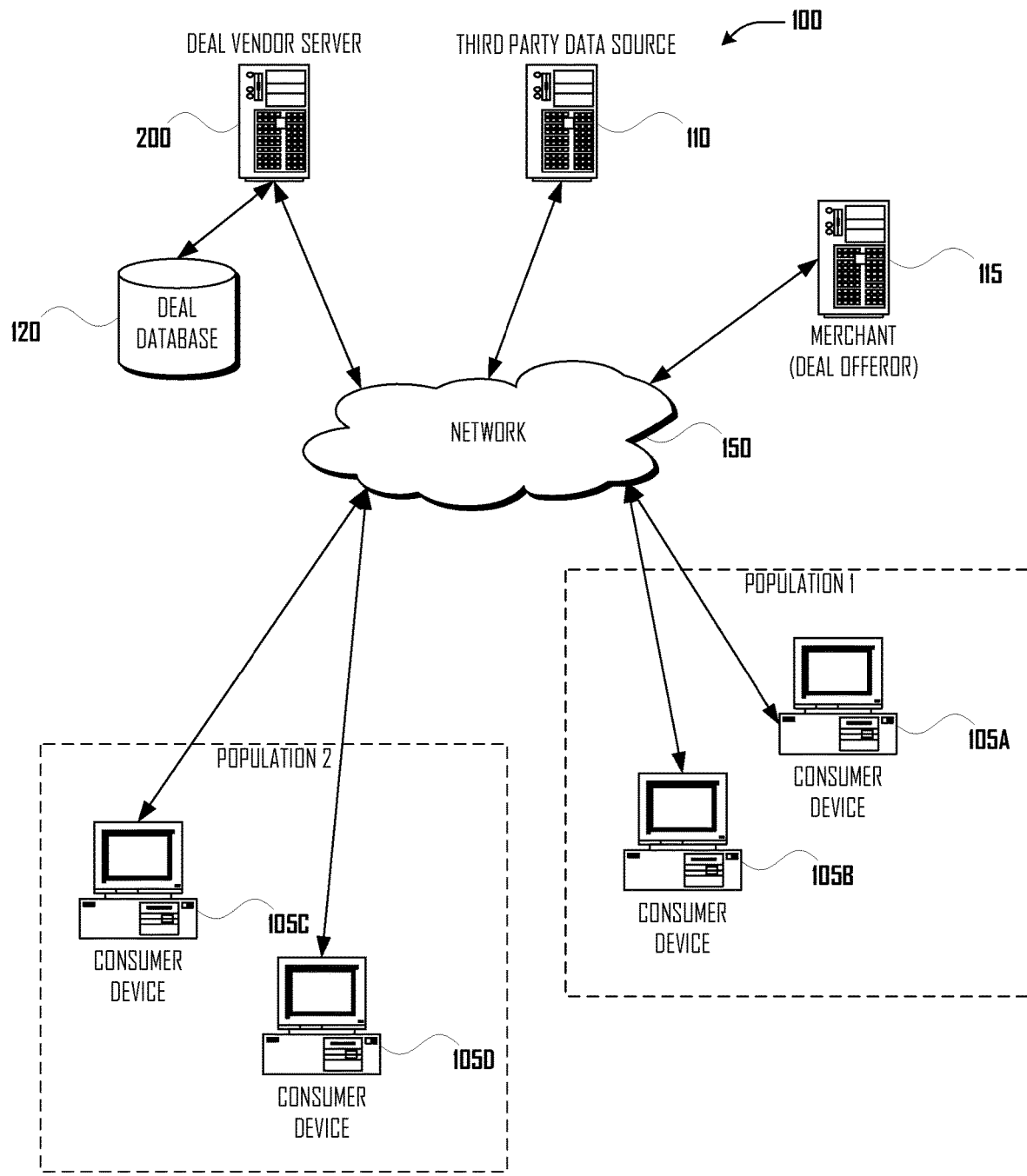
FIG. 1 is a network diagram in accordance with one embodiment.

Various embodiments, as described below, are directed generally to answering the question of which deal should be offered to a particular population for a given offer period to maximize the purchases and/or margin for a limited inventory window. Some embodiments may select deals to maximize relevancy to a target population, while also maximizing margin and/or revenue for the deal vendor and/or the deal-offering merchant. As discussed further below, such embodiments may deal with various constraints that are specific to deal-vending services, such as limited offer periods, limited deal quantities, target audience demographics and past deal behavior, deal-vendor margins, and the like.

In various embodiments, as described below, one or more potential deals may be evaluated and ranked according to several predictive yield metrics to optimize deal selection against a specific target population. Deal vendors may desire to evaluate potential deals in such a manner because a good-performing deal may generate many times more revenue than a bad-performing deal. Moreover, "good" deals may please a deal vendor's customers, causing them to share the vendor's deals with others and become loyal, repeat customers of future deals offered by the deal vendor.

In various embodiments, several deal characteristics may be evaluated against past deal-purchasing data for a target population to rank potential deals, potentially identifying deals that will be popular with consumers in the target population.

The detailed description that follows is represented largely in terms of processes and symbolic representations of operations by conventional computer components, including a processor, memory storage devices for the processor, connected display devices, and input devices. Furthermore, these processes and operations may utilize conventional computer components in a heterogeneous distributed computing environment, including remote file Servers, computer Servers, and memory storage devices. Each of these conventional distributed computing components is accessible by the processor via a communication network.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

FIG. 1 illustrates a number of interconnected devices in accordance with one embodiment. Deal database 120, merchant 115, consumer devices 105A-D, third party data source 110, and deal vendor server 200 are connected to network 150. In various embodiments, network 150 comprises communication switching, routing, and/or data storage capabilities. In various embodiments, network 150 may comprise some or all of the Internet, one or more intranets, and wired and/or wireless network portions. In various embodiments, there may be more than one deal database 120, merchant 115, and/or third party data source 110. Moreover, while FIG. 1 shows a single deal vendor server 200, in alternative embodiments, the functions, processes, and routines performed by deal vendor server 200 could be hosted or distributed among two or more different devices. Many embodiments may use multiple devices to comprise one logical device—for example, when deal vendor server 200 and/or deal database 120 are executed or hosted in a "cloud computing" environment.

Alternatively, in some embodiments, deal vendor server 200 and deal database 120 may be hosted on a single physical computing device. For example, in some embodiments, deal database 120 may include a process executing on deal vendor server 200.

In various embodiments, merchant 115, consumer devices 105A-D, and/or third party data source 110 may include any device that is capable of communicating with deal vendor server 200, including desktop computers, laptop computers, mobile phones and other mobile devices, PDAs, set-top boxes, and the like.

Figure 2:
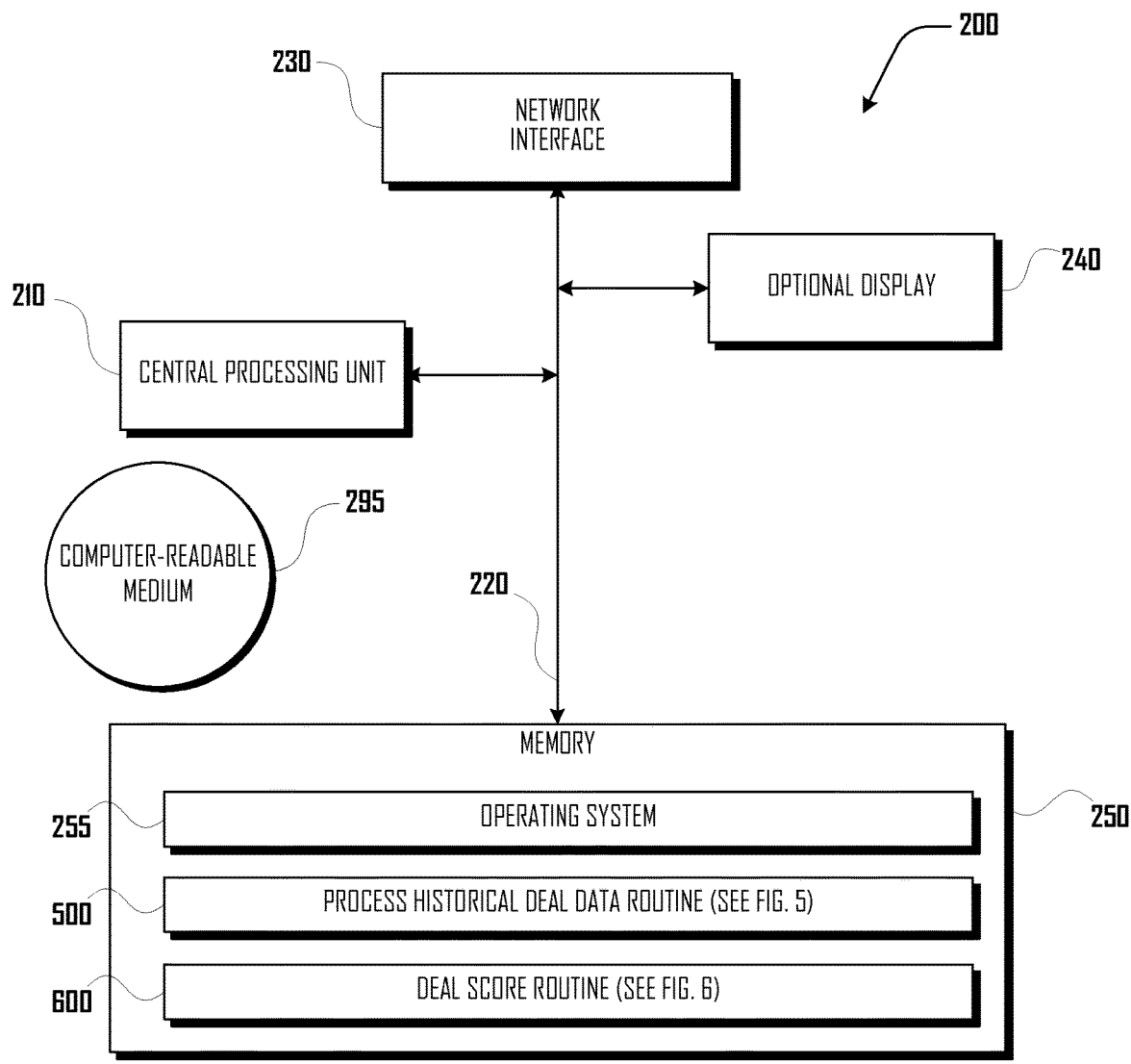
FIG. 2 illustrates one embodiment of a deal vendor server in accordance with one embodiment.

FIG. 2 illustrates an exemplary deal vendor server 200. The example system of FIG. 2 depicts a number of subsystems, modules, routines, and engines, some or all of which may by employed in a particular embodiment; the systems, modules, routines, and engines are not, however, limited to those illustrated. Other embodiments could be practiced in any number of logical software and physical hardware components and modules. The modules and components are listed herein merely for example.

Deal vendor server 200 includes a processing unit 210, a memory 225, and an optional display 240, all interconnected, along with network interface 230, via bus 220. Memory 250 generally comprises a random access memory ("RAM"), a read only memory ("ROM"), and/or a permanent mass storage device, such as a disk drive. In some embodiments, memory 250 may also comprise a local and/or remote database, database server, and/or database service, such as deal database 120. In other embodiments, network interface 230 and/or other database interface (not shown) may be used to communicate with deal database 120. Memory 250 stores program code for a deal rank routine 600 (see FIG. 6, discussed below). In addition, memory 250 stores an operating system 255.

These and other software components may be loaded from a non-transient computer readable storage medium 295 into memory 250 of deal vendor server 200 using a drive mechanism (not shown) associated with a computer readable storage medium 295, such as a floppy disc, tape, DVD/CD-ROM drive, memory card. In some embodiments, software components may also be loaded via the network interface 230 or other transient, non-storage media.

Figure 3:
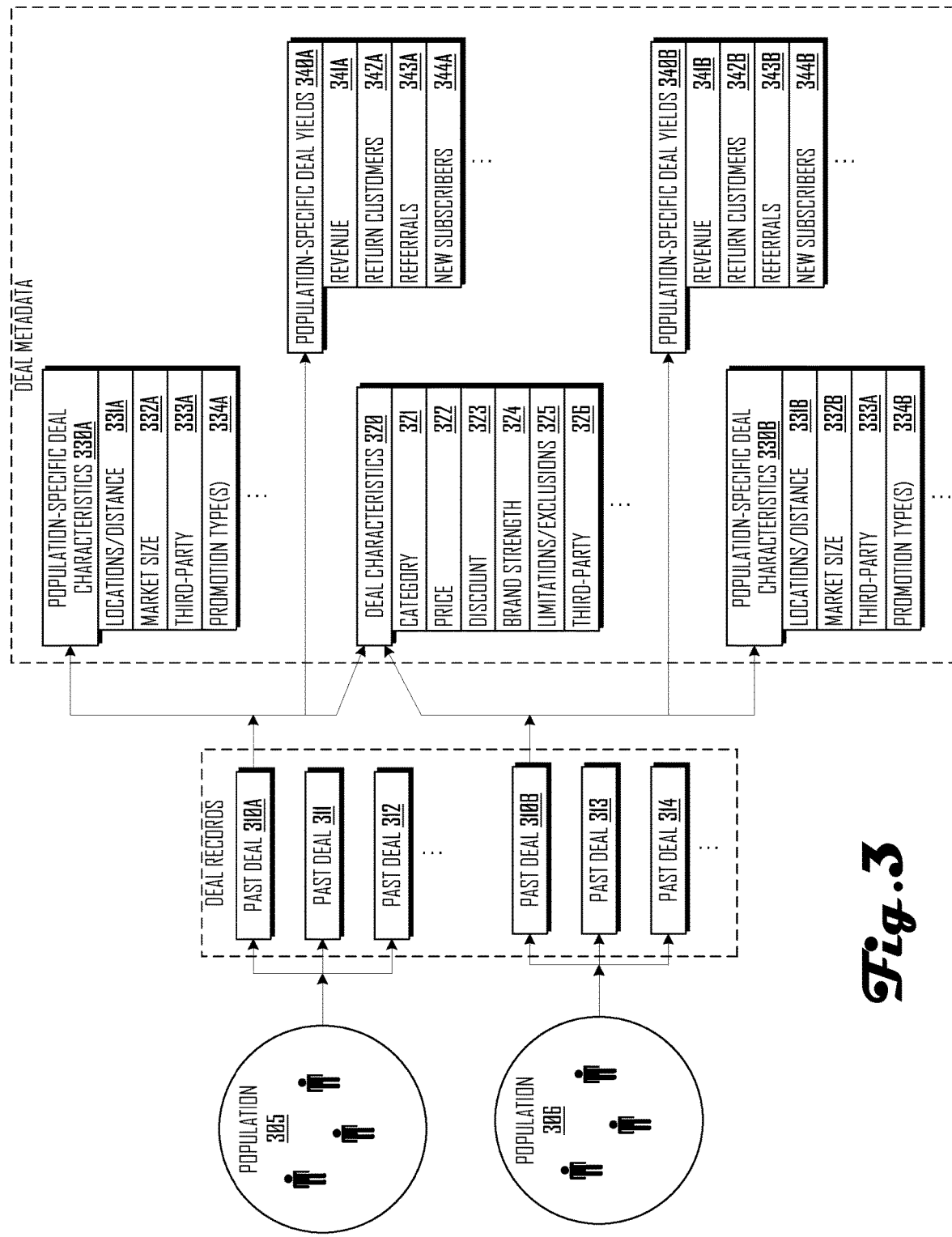
FIG. 3 illustrates a simplified conceptual overview of past-deal data associated with different populations, in accordance with one embodiment.

FIG. 3 illustrates a simplified conceptual overview of past-deal data associated with different populations, in accordance with one embodiment. Populations 305 and 306 represent two different sub-segments of a deal vendor's consumer list. For example, in one embodiment, population 305 may include a plurality of consumers in a particular city, zip code, or neighborhood, and population 306 may include a plurality of consumers in a different city, zip code, or neighborhood. In other embodiments, populations 305 and 306 may each include a plurality of customers segmented according to one or more demographic factors (e.g., age, sex, income, and the like).

Past deals 310A and 311-312 represent a subset of deals that have been previously offered to population 305. Similarly, past deals 310B and 313-314 represent a subset of deals that have been previously offered to population 306. In some embodiments, past deals 310-314 may be represented as records in deal database 120. In the illustrated example, past deal 310 was offered at some point to both of populations 305 and 306. In many embodiments, one or both of populations 305 and 306 may have been previously offered many more deals than those illustrated in FIG. 3. However, it is not necessary to show all past deals in order to disclose an illustrative embodiment.

Each of past deals 310A-B and 311-314 (as well as other past deals, not shown) is associated with metadata related to various characteristics of the deal and various past-performance yield metrics, metadata that is also stored in deal database 120.

For example, in the illustrated embodiment, past deal 310 (310A and 310B) is associated with (population-neutral) deal characteristics 320 (discussed in more detail below), including a category characteristic 321, a price characteristic 322, a discount characteristic 323, a brand strength characteristic 324, a limitations/exclusions characteristic 325, and one or more third-party characteristics 326. In other embodiments, metadata associated with more, fewer, and/or different characteristics may be similarly stored.

In one embodiment, a deal may be associated with a category characteristic 321, which classifies the goods and/or services for which the deal may be redeemed. For example, in one embodiment, a deal may be classified into categories such as the following:

dining and nightlife;
health and beauty;
fitness and nutrition;
retail and services;
activities and adventures;
travel;
and the like.

Furthermore, in some embodiments, deals may be sub-classified into sub-categories, sub-sub-categories, and so on (not shown). For example, in one embodiment, a "dining and nightlife" category may include several sub-categories, such as restaurants, bars, coffee, bakeries, nightclubs, and the like. For example, a deal that can be redeemed for $50 worth of food at "Joe's Diner" may be classified in the "dining and nightlife" category and the "restaurants" sub-category.

In one embodiment, a deal may be associated with a price characteristic 322, which refers to the purchase price of the deal itself (as opposed to the value of goods/services for which the deal can be redeemed). For example, a deal that can be purchased for $25 may have a price characteristic of $25. Price characteristic 322 is thus an objective measure.

In one embodiment, a deal may be associated with a discount characteristic 323, which refers to the price of the deal (322) compared to the value of goods/services for which the deal can be redeemed. For example, a deal that can be purchased for $25 and redeemed for $50 worth of food may have a "50%" discount characteristic. Discount characteristic 323 is thus an objective measure.

In one embodiment, a deal may be associated with a brand strength characteristic 324, which refers to the amount of goodwill associated with the brand name of the goods/services for which the deal can be redeemed. For example, a first merchant that has operated for years under a given brand name, with many favorable reviews, and is well-known as a source of high-quality goods/services may have more goodwill associated with its brand than a second merchant that is newly opened, recently changed its name, and/or is known as a source of low-quality goods/services. Thus, a deal redeemable at the first merchant may have a better brand strength characteristic 324 than a deal redeemable at the second merchant. In some embodiments, brand strength characteristic 324 may be a subjective measure assigned by an editor. In other embodiments, brand strength characteristic 324 may be an objective measure derived from automatically-determinable data, such as quantities of positive reviews for the merchant on social networking and/or review web sites, quantities of mentions in publicly accessible media, and the like.

In one embodiment, a deal may be associated with one or more limitations/exclusions characteristics 325, which refer to the quantity and/or quality of restrictions and/or limitations that are placed on the purchase and/or redemption of a deal. Examples of such limitations and/or exclusions may include characteristics such as some or all of the following:
  limitations on how many times a consumer is allowed to purchase a deal (e.g., limit one deal per person vs. limit ten deals per person);
  limitations on goods/services for which the deal can be redeemed (e.g., the deal cannot be redeemed for alcoholic beverages or the deal good only for some, but not all, of a merchant's services);
  limitations on when the deal can be redeemed (e.g., deal can be redeemed only Sunday-Thursday);
  and the like.

In one embodiment, a deal may be associated with one or more third-party characteristics 326, which may refer to any number of metrics maintained by and/or accessible from an entity other than the deal vendor. Examples of such third-party characteristics 326 may include characteristics such as some or all of the following:
  quantity and/or frequency of "check-ins" at the merchant's location(s) on a location-based social network service;
  merchant reviews, scores, and/or "star-ratings" on consumer-review services, local search services, or the like;
  quantity of "likes" associated with the merchant, quantity of "fans" associated with the merchant, quantity of group members associated with the merchant, and/or other similar measures of approval or approbation on one or more social network services;
  and the like.

In addition, each of past deals 310A-B and 311-314 (as well as other past deals, not shown) is associated with metadata related to various population-specific characteristics of the deal. For example, in the illustrated embodiment, past deal 310A is associated with population-specific deal characteristics 330A related to population 305, including a locations/distance characteristic 331A, a market size characteristic 332A, promotion type characteristic(s) 334A, and one or more third-party characteristics 323A. Past deal 310B is associated with population-specific deal characteristics 330B related to population 306, including a locations/distance characteristic 331B, a market size characteristic 332B, promotion type characteristic(s) 334B, and one or more third-party characteristics 323B. In other embodiments, metadata associated with more, fewer, and/or different population-specific characteristics may be similarly stored. In some embodiments, some such characteristics (e.g., market size 332) may be considered to be population-neutral characteristics.

In one embodiment, a deal may be associated with one or more location/distance characteristics 331, which refer to the relative geo-locations of consumers in the relevant population and the geo-location or locations of the merchant at which the deal can be redeemed, also referred to as fulfillment locations. Examples of such location/distance characteristics 331 may include characteristics such as some or all of the following:
  quantity of fulfillment locations (e.g., an independent spa may have only one location at which the deal can be redeemed, whereas a spa that is part of a large chain may have multiple fulfillment locations);
  distance from the target population to fulfillment location(s) (e.g., how far will a consumer in the target population likely have to travel to redeem the deal);
  and the like.

Some deals may be redeemable for services that are unrelated to any particular geo-location. For example, a deal that can be fulfilled on-line may require consumers in the target population to travel zero distance to redeem the deal. For another example, a deal for on-site auto-detailing (i.e., the merchant travels to the consumer) may similarly require consumers in the target population to travel zero distance to redeem the deal.

In one embodiment, a deal may be associated with a market size characteristic 332, which refers to the size of the addressable market within the target population. For example, deals that are redeemable for food may address a market consisting of essentially all of the target population (as virtually all consumers consume food). By contrast, a deal that is redeemable for a facial or a bikini wax may address a market consisting of a relatively large fraction of the target population (e.g., 50-60%, as fewer than all consumers typically consume such services). Deals for specialized goods/services (e.g., music DJ lessons) may address only a small fraction of the target population.

In one embodiment, a deal may be associated with one or more promotion type characteristic(s) 334, which refer to channels by which the deal was promoted to the target population. Examples of such promotion type characteristic(s) 334 may include promotion types such as some or all of the following:
  email promotion;
  social network promotion;
  micro-blogging promotion;

text message promotion;
television promotion;
radio promotion;
and the like.

In one embodiment, a deal may be associated with a one or more third-party population-specific characteristics 323. Examples of such third-party population-specific characteristics 323 may include characteristics such as some or all of the following:

- quantity and/or frequency of blog, micro-blog, status updates or other like posts about the particular deal;
- quantity of "likes" associated with the particular deal, quantity of "fans" associated with the particular deal, quantity of group members associated with the particular deal, and/or other similar measures of approval or approbation on one or more social network services;
- and the like.

Each of past deals 310A-B and 311-314 (as well as other past deals, not shown) is also associated with metadata related to various past-performance yield metrics, such as some or all of the following:

- revenue yield 341 (e.g., how much revenue did a given deal generate when offered to a given population);
- return customers yield 342 (e.g., in a given population, how many consumers who purchased a given deal also purchased a later-offered deal);
- referrals yield 343 (e.g., when offered to a given population, how many referrals did a given deal generate);
- new subscribers yield 344 (e.g., how many new consumers signed up with the deal vendor when a given deal was offered to a given population);
- and the like.

In other embodiments, metadata associated with more, fewer, and/or different yield metrics may be similarly stored.

Using deal characteristics 331-334 and 321-326 and past-performance yield metrics 341-344, various expected-yield curves may be determined for all of part of a population. As the term is used herein, "expected-yield curve" or "yield curve" refers to a data structure and/or program code that maps an input value to an output value according to a pre-determined scheme.

Figure 4:
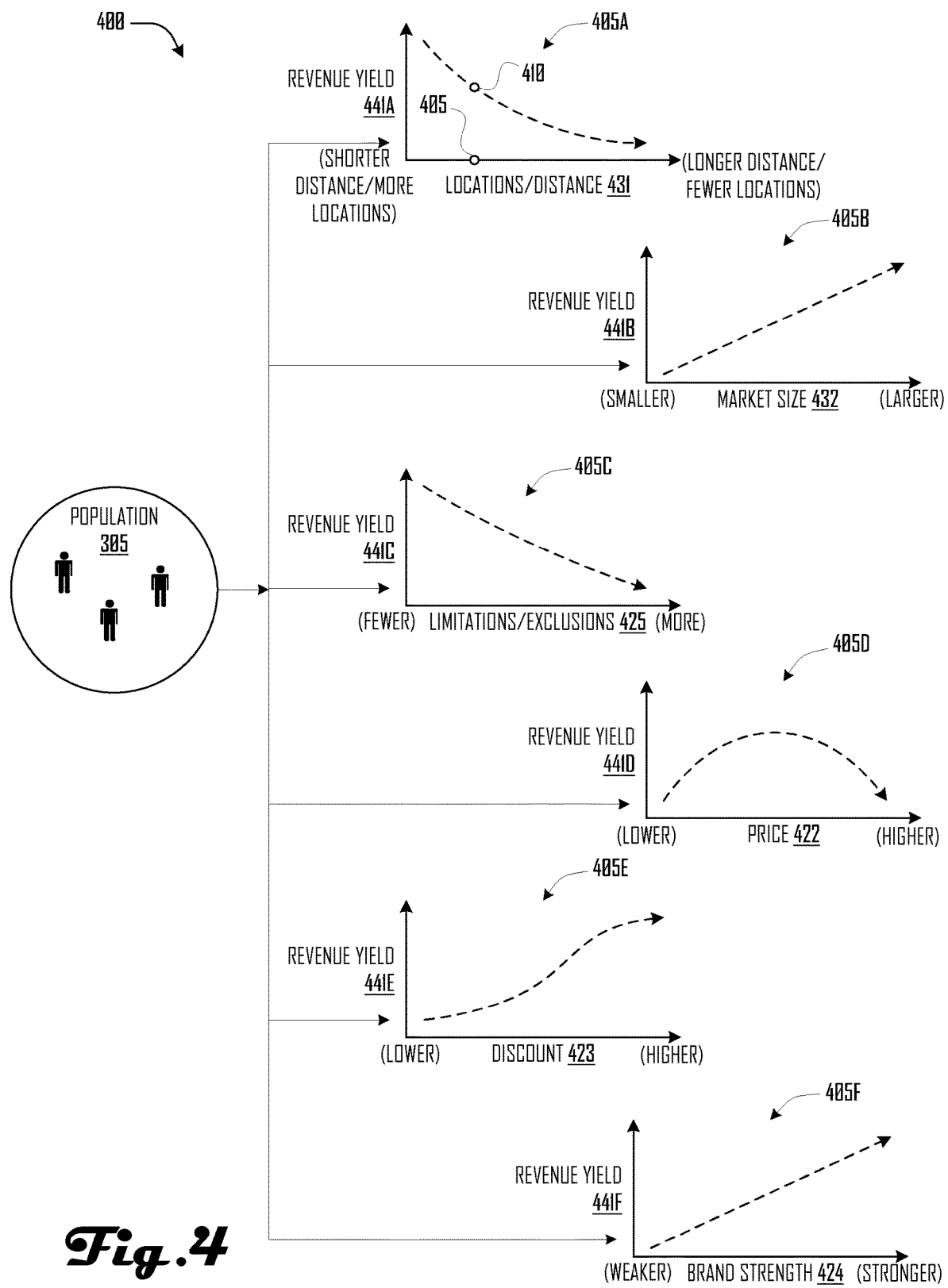
FIG. 4 illustrates several exemplary revenue-yield curves for an exemplary population, in accordance with one embodiment.

For example, FIG. 4 illustrates several exemplary yield curves 441A-F for population 305, which graphically illustrate relationships between the average revenue yields for a group of some or all of past deals (e.g., 310A, 311, 312, . . . ) that have been offered to population 305, in accordance with one embodiment.

Revenue/distance yield curve 405A shows that in population 305, average deal-revenue yields 441A vary according to a location/distance yield component 431. More specifically, average deal-revenue yields 441A are generally higher for deals in which fulfillment locations are more numerous and/or are geographically closer to population 305, and are generally lower for deals in which fulfillment locations are less numerous and/or are geographically distant from population 305. Thus, deals having a location/distance characteristic value 405 may have historically had an average deal yield value 410 in population 305.

Similarly, revenue/market size yield curve 405B shows that in population 305, average deal-revenue yields 441B generally vary directly according to the size of an addressable market yield component 432 within population 305. Revenue/limitations yield curve 405C shows that in population 305, average deal-revenue yields 441C generally decline as a deal limitation and/or exclusion yield component 425 increases.

Revenue/price yield curve 405D shows that in population 305, average deal-revenue yields 441D are highest for deals that are priced in the middle of a range of a price yield component 422. For example, members of population 305 may find that, other deal characteristics being equal, very low-priced deals are less likely to be worth the hassle of purchasing and redeeming the deal, whereas very high-priced deals may entice fewer consumers to purchase the deal.

Revenue/discount yield curve 405E shows that in population 305, average deal-revenue yields 441E are higher for deals in which a discount yield component 423 represents a higher discount level (e.g., 75%) than for deals in which discount yield component 423 represents a lower discount level (e.g., 25%). In populations that are more discount-sensitive, the revenue/discount yield curve 405E may be steeper, whereas in populations that are less discount-sensitive, the revenue/brand strength yield curve 405E may be shallower.

Revenue/brand strength yield curve 405F shows that in population 305, average deal-revenue yields 441F generally vary directly according to a brand strength yield component 424 of the merchant. In populations that are more brand-sensitive, the revenue/brand strength yield curve 405F may be steeper, whereas in populations that are less brand-sensitive, the revenue/brand strength yield curve 405F may be shallower.

Yield curves 405A-E represent only an exemplary set of yield components and yield curves that may be determined for a set of deals that have been offered to a given population. In other embodiments, any of deal characteristics 331-333 and 321-326, or other deal characteristics, may be treated as yield components for a given set of deals and compared for a given population against any of deal-yields 341-344, or other deal yields. Thus, some embodiments may determine for a given population, for example, yield curves such as some or all of the following:

- return-customer/location;
- return-customer/market-size;
- return-customer/price;
- return-customer/discount;
- return-customer/third-party-characteristic (e.g., return customers according to quantity of social network "likes" of the merchant, according to a star rating of the merchant on a consumer-reviews service, and the like);
- new-subscriber/location;
- new-subscriber/market-size;
- new-subscriber/price;
- new-subscriber/discount;
- return-customer/third-party-characteristic;
- and the like.

Moreover, in some embodiments, a set of yield curves may be further broken down by category. Thus, other embodiments may determine, for example, a first new-subscriber/price yield curve for deals in category "X" that have been offered to a given population, a second new-subscriber/price yield curve for deals in category "Y" that have been offered to the given population, and a third new-subscriber/price yield curve for deals in category "Z" that have been offered to a given population.

In various embodiments, as discussed below, deal-yield curves such as those discussed above may be used to determine a one or more population-specific expected-yield scores for a given prospective deal.

Figure 5:
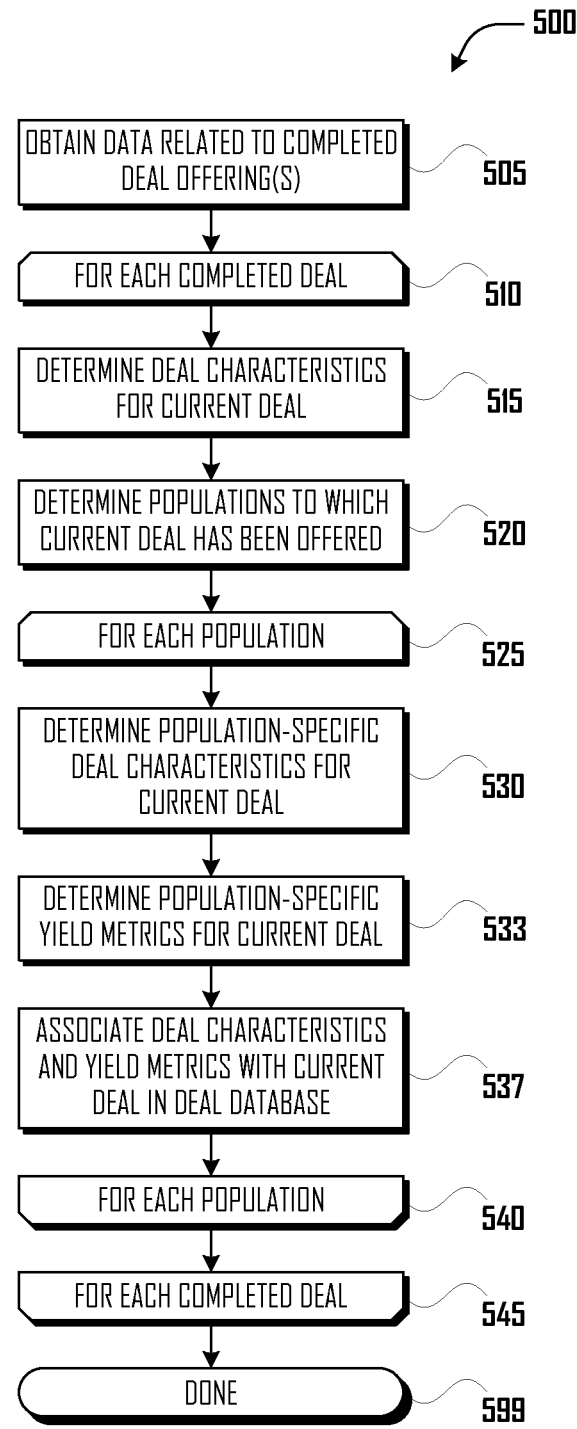
FIG. 5 illustrates a routine for processing historical deal data, in accordance with one embodiment.

FIG. 5 illustrates a routine 500 for processing historical deal data, in accordance with one embodiment. In various embodiments, routine 500 may be performed by deal vendor server 200 to add deal data to deal database 120, from which the deal data may be further processed by routine 600 (see FIG. 6, discussed below).

In block 505, routine 500 obtains data related to one or more completed deal offerings. For example, in one embodiment, routine 500 may obtain data from a corpus of one or more completed deals that were previously offered to one or more target populations.

Beginning in starting loop block 510, routine 500 processes each completed deal. In block 515, routine 500 determines one or more deal characteristics for the current completed deal. For example, in one embodiment, routine 500 may determine one or more population-neutral deal characteristics such as a category characteristic 321, a price characteristic 322, a discount characteristic 323, a brand strength characteristic 324, a limitations/exclusions characteristic 325, and/or one or more third-party characteristics 326, as discussed above in reference to FIG. 3. In some embodiments, some or all of the deal characteristics may be (or have previously been) automatically determined (e.g., price, discount, and the like). In other embodiments, some of the deal characteristics may have been determined through a partially automated or manual editorial process, or may have been specified by the merchant offering the deal (e.g., category, limitations/exclusions, and the like).

In block 520, routine 500 determines one or more target populations to which the current completed deal was offered. Beginning in opening loop block 525, routine 500 processes each of the one or more target populations.

In block 530, routine 500 determines one or more population-specific deal characteristics for the current completed deal. For example, in one embodiment, routine 500 may determine one or more population-specific deal characteristics such as locations/distance characteristic 331, a market size characteristic 332, promotion type characteristic(s) 334, and one or more third-party characteristics 323, as discussed above in reference to FIG. 3.

In block 533, routine 500 determines one or more population-specific yield metrics for the current completed deal. For example, in one embodiment, routine 500 may determine one or more population-specific yield metrics such as revenue yield 341, return customers yield 342, referrals yield 343, new subscribers yield 344, as discussed above in reference to FIG. 3.

In block 537, routine 500 associates the yield metrics determined in block 533 and the deal characteristics determined in blocks 515 and 530 with the current completed deal in a deal database (e.g., deal database 120).

In ending loop block 540, routine 500 iterates back to block 525 to process the next target population (if any). In ending loop block 545, routine 500 iterates back to block 510 to process the next completed deal (if any). Having processed each completed deal, routine 500 ends in block 599.

Figure 6:
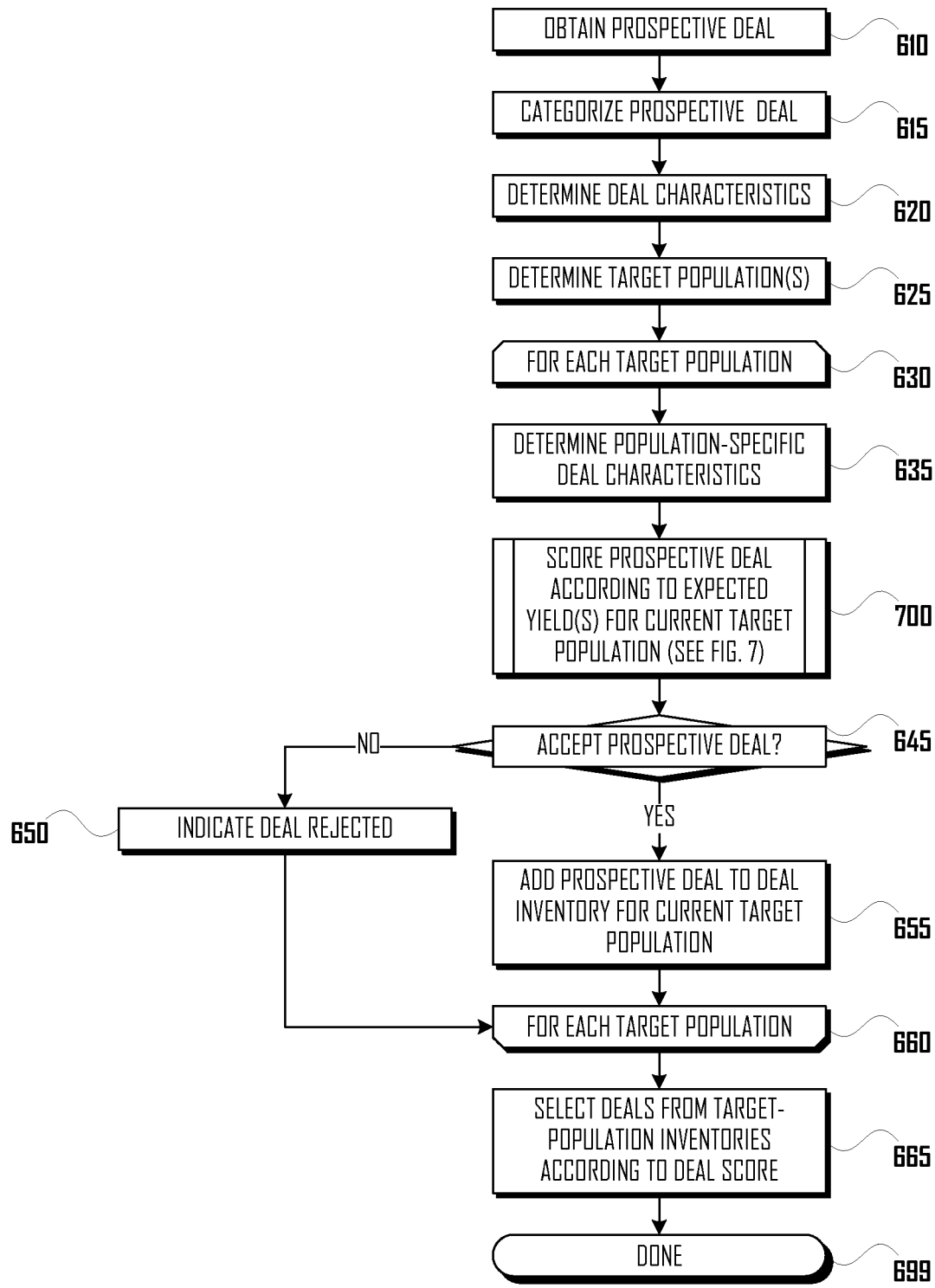
FIG. 6 illustrates a prospective-deal scoring routine, in accordance with one embodiment.

FIG. 6 illustrates a prospective-deal scoring routine 600, such as may be performed by deal vendor server 200 in accordance with one embodiment. In block 610, routine 600 obtains a prospective deal. For example, in one embodiment, a merchant (e.g., merchant 115) may submit a form via a web or other interface, the form specifying various aspects of a deal that the merchant wishes to offer via a deal vendor service (such as that offered by deal vendor server 200). In some embodiments, the prospective deal may specify deal characteristics such as the goods and/or services for which the deal can be redeemed; information about the merchant offering the deal and/or fulfilling the deal; locations at which the deal can be redeemed; time periods during which the deal can be redeemed; the price at which a consumer can purchase the deal; the value of the goods and/or services for which the deal can be redeemed; populations to which the deal may be targeted; and other like terms, conditions, and/or characteristics. In some embodiments, the merchant may also select a category into which the deal fits.

In block 615, routine 600 categorizes the prospective deal. In some embodiments, the prospective deal may be automatically categorized based on deal characteristics or other information obtained in block 610. In other embodiments, routine 600 may automatically determine a category based on a description of goods and/or services for which the deal can be redeemed, or based on information about the merchant at which the deal can be redeemed. In still other embodiments, a partially automated editorial process may be employed to categorize the prospective deal.

In block 620, routine 600 determines one or more (population-neutral) deal characteristics for the prospective deal. In some embodiments, some or all of such (population-neutral) deal characteristics may have been obtained in block 610 or may be automatically determinable from information obtained in block 610. In other embodiments, routine 600 may determine at least some of the (population-neutral) deal characteristics using a partially automated editorial process. In still other embodiments, routine 600 may determine one or more (population-neutral) deal characteristics using data obtained from a third-party data source (e.g., data source 110). For example, in one embodiment, routine 600 may obtain information about the merchant offering the deal and/or about the goods and/or services for which the deal can be redeemed from third-party social networking services, location-based services, bogging or micro-blogging services, consumer-review services, web search services, or the like.

In block 625, routine 600 determines one or more target populations to which the prospective deal may be offered. In some embodiments, routine 600 may be performed by a deal vendor server 200 that offers deals targeted to more than one population. In such embodiments, one or more target populations may have been specified in information obtained in block 610. Alternatively, one or more target populations may be automatically determined based on information about merchant locations at which the deal can be redeemed. For example, if the prospective deal can be redeemed at several locations within the greater Seattle area, then one or more target populations including consumers in the greater Seattle area may be determined. Similarly, if the if the prospective deal can be redeemed only at one location in the Queen Anne neighborhood of Seattle, then one or more target populations including consumers in the Queen Anne neighborhood and/or the 98119 and 98109 zip codes may be determined.

Beginning in opening loop block 630, routine 600 processes each of the one or more determined target populations. In block 635, routine 600 determines one or more population-specific deal characteristics. For example, in one embodiment, routine 600 may determine a size of the addressable market within the target population (see market size characteristic 332, discussed above in reference to FIG. 3). In some embodiments, routine 600 may instead or in addition determine one or more promotion types for promoting the prospective deal to the target population.

In subroutine block 700 (see FIG. 7, discussed below), routine 600 scores the prospective deal according to one or more expected yields for the current target population. For example, in one embodiment, routine 600 may score the prospective deal according to an expected revenue yield from the current target population (e.g., if the prospective deal were offered to the current target population, it would be expected to yield X dollars in revenue to the deal vendor service and/or to the merchant). In other embodiments, routine 600 may score the prospective deal according to other population-specific yields, such as a new subscriber yield (e.g., if the prospective deal were offered to the current target population, it would be expected to yield X new subscribers to the deal vendor service), a return customer yield (e.g., if the prospective deal were offered to the current target population, it would be expected to yield X return customers to the deal vendor service), or the like.

In decision block 645, routine 600 determines whether to accept the prospective deal. For example, in one embodiment, routine 600 may compare one or more expected yield scores against one or more thresholds to determine whether to accept the prospective deal for potential offering to the current target population. If routine 600 determines not to accept the prospective deal, then in block 650, routine 600 indicates that the deal is rejected. For example, in one embodiment, routine 600 may indicate (e.g., via a web interface) to the requesting merchant that the prospective deal does not meet one or more standard for deals targeted to the current population. In some embodiments, routine 600 may further provide information about the expected yield(s) that caused the prospective deal to be rejected, and/or routine 600 may further provide information about how to improve the expected yield of the deal (e.g., remove limitations, lower the price/increase the discount level, and the like).

On the other hand, if in block 645, routine 600 determines to accept the prospective deal, then in block 655, routine 600 adds the prospective deal to a deal inventory for the current population. For example, in one embodiment, routine 600 may associate the prospective deal with a target-population deal inventory in deal database 120. In ending loop block 660, routine 600 iterates back to block 630 to process the next target population (if any).

At some point after processing all of the target populations, in block 665, routine 600 uses the expected-yield scores determined in iterations of block 700 to select deals for various target populations from various target-population deal inventories. For example, in one embodiment, routine 600 may fill an opening to offer a deal on a given day to a given target population, selecting a deal that is expected to yield a high return according to one or more population-specific yield metrics (e.g., revenue, new subscribers, and the like).

Routine 600 ends in block 699.

Figure 7:
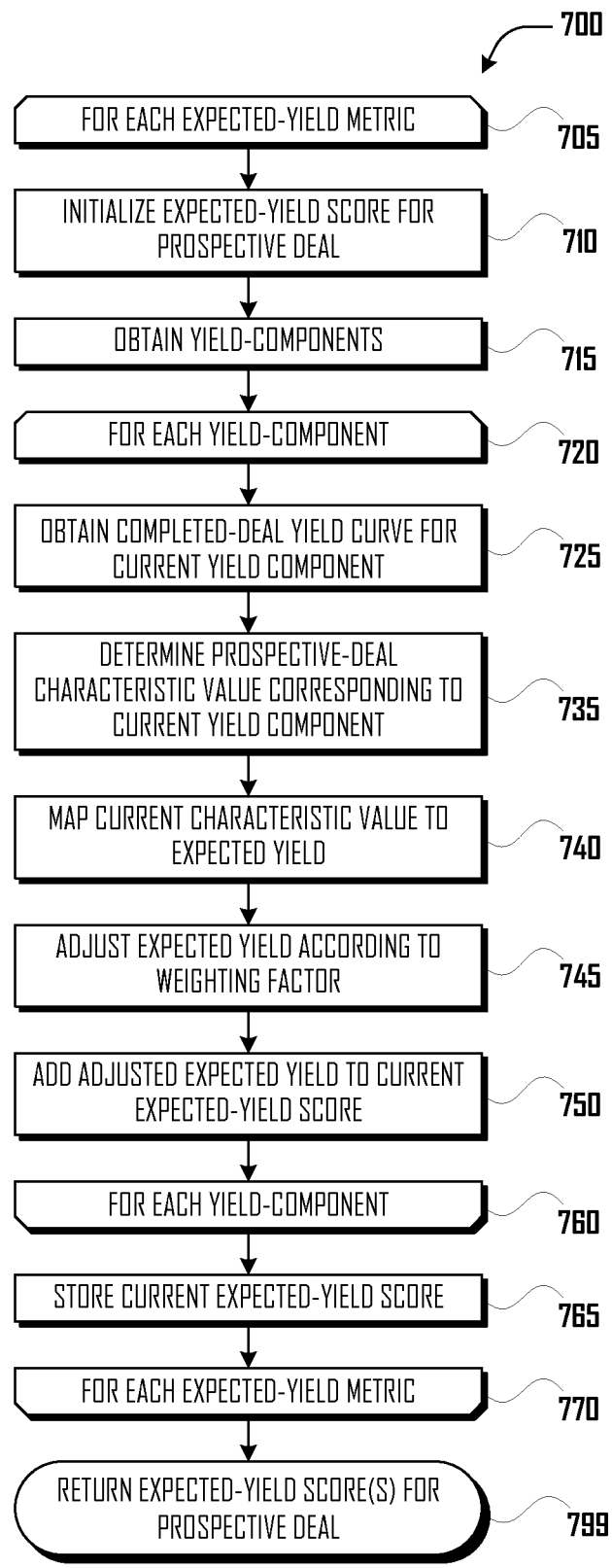
FIG. 7 illustrates a scoring subroutine for scoring a prospective deal according to one or more expected yields for a given target population, in accordance with one embodiment.

FIG. 7 illustrates a scoring subroutine 700 for scoring a prospective deal according to one or more expected-yield metrics for a given target population, in accordance with one embodiment. Beginning in opening loop block 705, subroutine 700 processes one or more population-specific expected-yield metrics. For example, in one embodiment, subroutine 700 may process one or more population-specific expected-yield metrics such as an expected-revenue yield, an expected-return-customers yield, an expected-referrals yield, an expected-new-subscribers yield, and the like.

In block 710, subroutine 700 initializes an expected-yield score data structure for the current expected yield metric. In block 715, subroutine 700 obtains one or more yield-component characteristics. In some embodiments, the one or more yield-component characteristics are selected from a group of deal characteristics associated with the prospective deal and the target population. The one or more yield components may in some embodiments be selected from a group including deal characteristics 321-326 and population-specific deal characteristics 331-333 (as discussed above in relation to FIG. 3). For example, in one exemplary embodiment, an expected-revenue-yield score may be determined from yield curves 405A-F, as illustrated in FIG. 4, discussed above. In such an exemplary embodiment, the yield components would include a locations/distance yield component 431, a market size yield component 432, a limitations/exclusions yield component 425, a price yield component 422, a discount yield component 423, and a brand strength yield component 424.

Beginning in opening loop block 720, subroutine 700 processes each of the one or more yield components obtained in block 715. In block 725, subroutine 700 obtains and/or determines one or more completed-deal yield curves for the current yield component. For example, in one exemplary embodiment, subroutine 700 may obtain one of yield curves 405A-F, as illustrated in FIG. 4, discussed above.

In block 735, subroutine 700 determines the value of a deal characteristic of the prospective deal that corresponds to the current yield component. For example, in one exemplary embodiment, if the current yield component were discount yield component 423, then subroutine 700 would determine the value of the discount deal characteristic 323 for the prospective deal. Similarly, if the current yield component were market size yield component 432, then subroutine 700 would determine the value of the market size deal characteristic 332 for the prospective deal and the given target population.

In block 740, subroutine 700 maps the value of the deal characteristic obtained in block 735 to an expected yield according to the current completed-deal yield curve. For example, if the current yield component were locations/distance component 431, the current completed-deal yield curve were yield curve 405A, and the current deal characteristic (locations/distance deal characteristic 331) had value 405, then subroutine 700 would map deal characteristic value 405 to expected yield 410.

In block 745, subroutine 700 adjusts the expected yield obtained in block 745 according to a weighting factor that controls how various yield components are combined. In some embodiments, yield components may be weighted equally. For example, in an exemplary embodiment, each of six yield components (locations/distance yield component 431, market size yield component 432, limitations/exclusions yield component 425, price yield component 422, a discount yield component 423, and brand strength yield component 424) may be assigned a weighting factor of ⅙, such that the sum of each of the six expected yield components would represent an overall expected yield for the current yield metric.

In other embodiments, different yield components may be weighted differently, as in some embodiments, a given category of deal may not be significantly affected by certain yield components For example, for deals in categories in which goods and/or services are fulfilled electronically, a locations/distance yield component may play a small or negligible role in determining an expected yield. (Alternatively, for such categories, a locations/distance yield component may be completely omitted from expected-yield determinations, or assigned a weight of zero to constructively omit the yield component from the expected-yield determination.)

Conversely, in some embodiments, for certain populations and/or categories, some yield components (e.g., a price yield component and/or a discount yield component) may dominate the expected yield, such yield components being assigned higher weighting factors than other yield components.

In block 750, subroutine 700 accumulates the current adjusted expected yield into the overall expected-yield score data structure (initialized in block 710) for the current expected-yield metric (for the given prospective deal and the given target population).

In closing loop block 760, subroutine 700 iterates back to block 720 to process the next yield component (if any). Once all yield components have been processed, in block 765, subroutine 700 stores (at least in transient memory) the current expected-yield score (which includes weighted expected yield values derived from each yield component for the current expected-yield metric). In some embodiments, the current expected-yield score is stored at least until the current expected-yield score is returned in block 799.

In closing loop block 770, subroutine 700 iterates back to block 705 to process the next population-specific expected-yield metric (if any). Having processed each population-specific expected-yield metric, subroutine 700 ends in block 799, returning one or more expected-yield scores for the prospective deal.

Although specific embodiments have been illustrated and described herein, a whole variety of alternate and/or equivalent implementations may be substituted for the specific embodiments shown and described without departing from the scope of the present disclosure. This application is intended to cover any adaptations or variations of the embodiments discussed herein.

We claim:

1. A method comprising:
    receiving, over a network, a prospective deal from a remotely located merchant, wherein the prospective deal includes one or more merchant specified deal components, and wherein the one or more merchant specified deal components are specified by the remotely located merchant via a form displayed on a user interface;
    receiving, over the network, data from a remotely located third-party source;
    converting the data received from the remotely located third-party source into one or more third-party derived deal components, wherein the one or more merchant specified deal components and the one or more third-party derived deal components include a distance characteristic, a market size characteristic, a price characteristic, a discount characteristic, and a brand strength characteristic;
    performing a programmatic analysis for the prospective deal based on:
        determining selected yield curve functions from a set of yield curve functions stored within a database based on querying the database using the one or more merchant specified deal components and the one or more third-party derived deal components, wherein the selected yield curve functions include a yield curve function for each of the distance characteristic, the market size characteristic, the price characteristic, the discount characteristic, and the brand strength characteristic;
        determining expected yield values for each of the selected yield curve functions by providing, as input, the one or more merchant specified deal components and the one or more third-party derived deal components associated with each selected yield curve function, wherein the expected yield values include a yield value for each of the distance characteristic, the market size characteristic, the price characteristic, the discount characteristic, and the brand strength characteristic; and
        determining an associated threshold for each of the expected yield values;
        comparing expected yield values against the associated thresholds for each of the expected yield values to determine whether to accept the prospective deal; and
    in a circumstance where each of the expected yield values satisfy the associated threshold for each of the expected yield values:
        accepting the prospective deal; and
        providing, over the network, to the user interface associated with the remotely located merchant a first indication that the prospective deal has been accepted.

2. The method of claim 1, further comprising:
    in a circumstance where each of the expected yield values do not satisfy the associated threshold for each of the expected yield values:
    rejecting the prospective deal; and
    providing, over the network, to the user interface associated with the remotely located merchant a second indication that the prospective deal has been rejected.

3. The method of claim 2, wherein the second indication includes information about the expected yield values and a recommendation about improving the expected yield values.

4. The method of claim 3, wherein the recommendation about improving the expected yield values includes removing at least one of the merchant specified deal components.

5. The method of claim 1, further comprising:
    determining one or more consumer device populations to target with the prospective deal using the one or more merchant specified deal components and the one or more third-party derived deal components.

6. The method of claim 5, wherein the one or more consumer device populations include a return consumer, a new consumer, or a consumer associated with a location.

7. The method of claim 1, wherein the one or more merchant specified deal components and the one or more third-party derived deal components further include one or more promotion type characteristics, including an email promotion, a social network promotion, a micro-blogging promotion, a text message promotion, a television promotion, or a radio promotion.

8. A computer program product comprising at least one non-transitory computer-readable storage medium having computer-executable program code portions stored therein, the computer-executable program code portions comprising program code instructions configured to:
    receive, over a network, a prospective deal from a remotely located merchant, wherein the prospective deal includes one or more merchant specified deal components, and wherein the one or more merchant specified deal components are specified by the remotely located merchant via a form displayed on a user interface;
    receive, over the network, data from a remotely located third-party source;
    convert the data received from the remotely located third-party source into one or more third-party derived deal components, wherein the one or more merchant specified deal components and the one or more third-party derived deal components include a distance characteristic, a market size characteristic, a price characteristic, a discount characteristic, and a brand strength characteristic;

perform a programmatic analysis for the prospective deal based on:
  determine selected yield curve functions from a set of yield curve functions stored within a database based on querying the database using the one or more merchant specified deal components and the one or more third-party derived deal components, wherein the selected yield curve functions include a yield curve function for each of the distance characteristic, the market size characteristic, the price characteristic, the discount characteristic, and the brand strength characteristic;
  determine expected yield values for each of the selected yield curve functions by providing, as input, the one or more merchant specified deal components and the one or more third-party derived deal components associated with each selected yield curve function, wherein the expected yield values include a yield value for each of the distance characteristic, the market size characteristic, the price characteristic, the discount characteristic, and the brand strength characteristic; and
  determine an associated threshold for each of the expected yield values;
  compare expected yield values against the associated thresholds for each of the expected yield values to determine whether to accept the prospective deal; and
  in a circumstance where each of the expected yield values satisfy the associated threshold for each of the expected yield values:
    accept the prospective deal; and
    provide, over the network, to the user interface associated with the remotely located merchant a first indication that the prospective deal has been accepted.

9. The computer program product of claim 8, wherein the computer-executable program code portions further comprise program code instructions configured to:
  in a circumstance where each of the expected yield values do not satisfy the associated threshold for each of the expected yield values:
    reject the prospective deal; and
    provide, over the network, to the user interface associated with the remotely located merchant a second indication that the prospective deal has been rejected.

10. The computer program product of claim 9, wherein the second indication includes information about the expected yield values and a recommendation about improving the expected yield values.

11. The computer program product of claim 10, wherein the recommendation about improving the expected yield values includes removing at least one of the merchant specified deal components.

12. The computer program product of claim 8, wherein the computer-executable program code portions further comprise program code instructions configured to:
  determine one or more consumer device populations to target with the prospective deal using the one or more merchant specified deal components and the one or more third-party derived deal components.

13. The computer program product of claim 12, wherein the one or more consumer device populations include a return consumer, a new consumer, or a consumer associated with a location.

14. The computer program product of claim 8, wherein the one or more merchant specified deal components and the one or more third-party derived deal components further include one or more promotion type characteristics, including an email promotion, a social network promotion, a micro-blogging promotion, a text message promotion, a television promotion, or a radio promotion.

15. An apparatus comprising at least one processor and at least one memory including computer program code, the at least one memory and the computer program code configured to, with the at least one processor, cause the apparatus to:
  receive, over a network, a prospective deal from a remotely located merchant, wherein the prospective deal includes one or more merchant specified deal components, and wherein the one or more merchant specified deal components are specified by the remotely located merchant via a form displayed on a user interface;
  receive, over the network, data from a remotely located third-party source;
  convert the data received from the remotely located third-party source into one or more third-party derived deal components, wherein the one or more merchant specified deal components and the one or more third-party derived deal components include a distance characteristic, a market size characteristic, a price characteristic, a discount characteristic, and a brand strength characteristic;
  perform a programmatic analysis for the prospective deal based on:
    determine selected yield curve functions from a set of yield curve functions stored within a database based on querying the database using the one or more merchant specified deal components and the one or more third-party derived deal components, wherein the selected yield curve functions include a yield curve function for each of the distance characteristic, the market size characteristic, the price characteristic, the discount characteristic, and the brand strength characteristic;
    determine expected yield values for each of the selected yield curve functions by providing, as input, the one or more merchant specified deal components and the one or more third-party derived deal components associated with each selected yield curve function, wherein the expected yield values include a yield value for each of the distance characteristic, the market size characteristic, the price characteristic, the discount characteristic, and the brand strength characteristic; and
    determine an associated threshold for each of the expected yield values;
    compare expected yield values against the associated thresholds for each of the expected yield values to determine whether to accept the prospective deal; and
  in a circumstance where each of the expected yield values satisfy the associated threshold for each of the expected yield values:

accept the prospective deal; and provide, over the network, to the user interface associated with the remotely located merchant a first indication that the prospective deal has been accepted.

16. The apparatus of claim 15, further caused to:

in a circumstance where each of the expected yield values do not satisfy the associated threshold for each of the expected yield values:

reject the prospective deal; and provide, over the network, to the user interface associated with the remotely located merchant a second indication that the prospective deal has been rejected.

17. The apparatus of claim 16, wherein the second indication includes information about the expected yield values and a recommendation about improving the expected yield values.

18. The apparatus of claim 17, wherein the recommendation about improving the expected yield values includes removing at least one of the merchant specified deal components.

19. The apparatus of claim 15, further caused to:

determine one or more consumer device populations to target with the prospective deal using the one or more merchant specified deal components and the one or more third-party derived deal components.

20. The apparatus of claim 19, wherein the one or more consumer device populations include a return consumer, a new consumer, or a consumer associated with a location.

* * * * *